Patented July 7, 1953

2,644,809

UNITED STATES PATENT OFFICE 2,644,809

FRIEDEL-CRAFTS ISOBUTYLENE POLYMERIZATIONS IN CHLOROFLUOROALKANE SOLUTION

John S. Saylor, Jr., Sinking Spring, Pa., assignor to Standard Oil Development Company, a corporation of Delaware No Drawing. Application January 11, 1950, Serial No. 138,063

8 Claims. (Cl. 260—85.3)

This invention relates to low temperature polymerization processes for olefinic material, relates particularly to the low temperature polymerization of mixtures of olefins and mono-olefins, and relates especially to low temperature olefinic polymerization in the presence of chloro-fluoro-substituted alkanes which are non-solvents for and insoluble in the olefinic polymer, are solvents for, and mixable with, the olefinic monomers, are liquid at the polymerization temperature and by their presence modify the copolymerization ratio in such a way as to increase the unsaturation of the copolymer from a given polymerizate mixture, and simultaneously prevent coalescence of particles of polymer into large masses.

This application is a continuation-in-part of my copending applications, Serial No. 502,438, filed September 15, 1943, now abandoned, and Serial No. 556,658, filed September 30, 1944, which issued January 17, 1950 as U. S. 2,494,585.

It has been found possible to polymerize olefins such as isobutylene in admixture with a polyolefin such as butadiene or isoprene or the like at temperatures ranging from —20° C. to —100° C., or even as low as —164° C. by the application thereto of a Friedel-Crafts catalyst, preferably in solution in a low-freezing, non-complex-forming solvent to yield a highly valuable synthetic substitute for rubber. However, the reaction is difficult to control and difficult to conduct because of the thick, heavy, gummy character of the polymer both at the low temperature of polymerization and at room temperature; and great difficulty has been encountered in developing a process which was both simple to operate and at the same time yielded a high grade polymer.

My previous application for patent, Serial No. 556,658, now Patent No. 2,494,585 showed that if the polymerization was conducted in the presence of a fugitive solid, in a kneader, the solid, under the influence of the kneader plates exerted a grinding action upon the polymer, whereby the polymer was broken up into small fragments, especially in the presence of a diluent such as methyl chloride or the like. The combination of results were obtained that the formation of large chunks of polymer was avoided, and the resulting polymer showed much superior tensile strength and other improved properties.

It is now found, according to the present invention, that substantially better results are obtainable by the use of the chloro-fluoro-compound in liquid form. According to the present invention it is found that it is not necessary that the chloro-fluoro-substituted alkane compound be present as a fugitive solid, but that if it is present as a liquid, in the substantial absence of other inert diluents (except for small amounts of catalyst solvent), the polymer remains dispersed in the reactor liquid in satisfactorily small particles, and the resulting polymer has properties which are still better than those produced by my previously disclosed processes. The best results are obtained from a material in which there is present only the unsaturates, the catalyst (preferably in solution), and the chloro-fluoro-substituted compounds, but practically as good results are obtained when the catalyst is added in solution in comparatively small amounts of a chloro alkane such as methyl or ethyl chloride, but still better results are obtained if the catalyst also is dissolved in a fluoro-substituted alkane as shown in the copending application of Welch and Wilson, Serial No. 64,236, filed December 8, 1948.

The copolymer of isobutylene with a multi-olefin such as isoprene or butadiene or the like has been produced from several different types of mixtures. For instance, the cold mixture of isobutylene and diolefin can be polymerized as such, by the addition of liquid catalyst to the cold mixed unsaturates in the absence of significant amounts of diluent. When the reaction is conducted under these conditions, the polymerization ratio between the isobutylene and diolefin tends to be relatively high, the molecular weight tends to be somewhat low, and the iodine number tends to be relatively high, but not as high as the proportion of copolymerized diolefin would indicate. Also, considerable amounts of polymer are produced which are found to be insoluble in solvents, these two phenomena together indicating the presence of an excessive amount of cross-linkage in the polymer. The relatively low molecular weight, the presence of insoluble material and the generally poor character of non-diluent polymer has caused this process to be regarded as unsatisfactory. The presence of a diluent such as the light naphthas modify the copolymerization ratio to reduce sharply the proportion of diolefin to isobutylene, and to remove substantially completely all tendency towards cross-linkage, but the process is exceedingly difficult to operate because of the inordinately high viscosity of polymer solutions in hydrocarbons, especially at the polymerization temperature. The use of a diluent for the polymerization which is a non-solvent for the completed polymer yields a commercial process in which the polymer is produced as a slurry of relatively low viscosity, and substantially no cross-linked polymer is produced, but the ratio of diolefin to isobutylene is undesirably low, and the iodine number also is undesirably low. Polymerization in the presence of a fluoro alkane in which both the olefinic monomers and the polymer are insoluble yields a slurry of polymer which can be handled, but the characteristics of the polymer are undesirably close to those obtained from the simple mixed monomers in the absence of diluent.

According to the present invention, it is now found that if a chloro-fluoro alkane compound, in which the monomers are soluble and the polymer insoluble, is used, the unexpected and valuable effect is obtained that the copolymerization ratio of diolefin to isobutylene is relatively high, substantially no cross-linkage occurs and the iodine number obtainable from a given proportion of diolefin to isobutylene is also desirably high. The resulting copolymer shows the interesting and valuable property of significantly and substantially higher cure rate than is obtainable by any other procedure.

Thus the invention provides a new and useful combination of elements, utilizing as the copolymerizate material, a mixture of a major proportion of isobutylene with a minor proportion of a multi-olefin in the presence of a chloro-fluoro-substituted alkane polymerized at temperatures within the range between about $-20°$ C. and $-164°$ C.

Other objects and details of the invention will be apparent from the following description.

In practicing the invention, any convenient type of reactor may be used, such as a kneader of the general character of the so-called "Werner-Phleiderer" type, or the commercially standard refrigerant jacketed cylinder for continuous operation. In the kneader, the kneader blades provide an excellent agitation of the polymerizate mixture, especially when operated at relatively high rotational speeds; in the cylindrical type of commercial reactor a large propeller-type stirrer likewise provides ample agitation and circulation of the material. The reactor may then be charged with the desired isobutylene-multi-olefin mixture together with a suitable chloro-fluoro-substituted alkane, the mixture being then treated with a Friedel-Crafts catalyst at a temperature within the range between $-20°$ C. and $-164°$ C., preferably within the range between about $-70°$ C. and $-103°$ C. It is of the essence of the present invention that the chloro-fluoro alkane shall be liquid at the polymerization temperature, and it is preferable that it shall be volatile at a temperature below the boiling point of water, or preferably that it shall be volatile at a temperature below room temperature.

The preferred substance is the dichlorodifluoromethane. Other suitable substances are shown in the following table:

| Name | Formula | M. P., °C. | B. P., °C. |
|---|---|---|---|
| Dichlorodifluormethane (Freon-12) | $CCl_2F_2$ | $-155.0$ | $-22$ |
| Trichloromonofluormethane (Freon-11) | $CCl_3F$ | $-88.0$ | 75 |
| Dichloromonofluormethane (Freon-21) | $CHCl_2F$ | $-127.0$ | 48 |
| Dichlorotetrafluorethane (Freon-114) | $C_2Cl_2F_4$ | $-105.5$ | 3.38 |

These substances are the preferred ones of a considerable number of fluoro-substituted alkanes which are satisfactory for the purposes of the present invention.

It may be noted that all of these substances are non-reactive in the polymerization reaction, all show a very low solubility for and solubility in the polymer, and all are solvents for, and readily mixable with isobutylene and the multi-olefins in the olefinic mixture.

By this combination of components with the stated characteristics, the unexpected and very valuable result then appears—that the solid polymer is produced in very small particles which show very little tendency to coalesce into lumps or adhere to the walls of the reactor, thereby maintaining an excellent slurry of small solid polymer particles in the fluoroalkane through the entire polymerization reaction, and through the warming up stage as well as in a water slurry; at the same time the properties of polymer when cured are markedly improved especially in curing speed because of the very unusual and unexpected phenomenon that a higher amount of unsaturation is obtainable in the finished polymer from a given mixture of isobutylene and multi-olefin than is obtainable by any other procedure; this increase in unsaturation varying from an increase of 10% to an increase of nearly 100%, this improvement being particularly well shown in the continuous reactor where a portion only of the unsaturates are copolymerized. Also, a very sharply reduced amount of polymer adheres to the inner walls of the reactor, especially in the cylindrical continuous reactor. These advantages appear to be due in part to the high insolubility of the polymer in the chloro-fluoro-substituted alkanes, and the very low solubility of the alkanes in the polymer.

It may be noted particularly that the chloro-fluoro compounds show an excellent solubility for and mixable with the olefinic monomers, when used as reactant diluents, and show a very high degree of insolubility for the copolymer. This combination of properties thus makes possible the preparation of a conveniently concentrated solution of monomers in diluent, which, after polymerization yields an excellent slurry of polymer in the chloro-fluoro alkane.

The fact that many of the chloro-fluorine containing alkyl compounds have boiling points above room temperature, and an extremely low solvent power for and solubility in the polymer permits of a ready separation of the solid polymer from the slurry or emulsion in the alkyl chloro-fluoro compound, at room temperature by a relative simple filtration procedure. In bringing the temperature from polymerization temperature to room temperature, practically all of the olefinic polymerization mixture substances present volatilize away from the polymer substantially completely, leaving behind enough liquid alkyl chlorofluoride to maintain the suspension, from which the polymer is easily recovered by a filtration procedure followed by washing with water, for milling at an elevated temperature, to remove the last of the liquid material.

For the polymerization procedure, the reactor is cooled to a polymerization temperature ranging from $-20°$ C. down to $-164°$ C. depending upon the refrigerant used. To the cold reactor there is then added the desired polymerizable olefinic material.

This material preferably consists of isobutylene but in some instances may consist of a higher iso-olefin such as 2-methyl, butene-1 or 2-methyl, pentene-1 or 2-methyl, hexene-1, iso-octene or the like; in admixture with a polyolefin such as butadiene or isoprene or piperylene or dimethallyl (also known as diisobutyenyl) or myrcene or the like. These are the preferred polyolefins but substantially any of the polyolefins having from 4 to 14 carbon atoms per molecule are useful. The isoolefin is preferably present in major proportion and the polyolefin in minor proportion; the best proportions lying within the range from 70 parts to 99.5 parts of the isoolefin with 30 parts to 0.5 part of the polyolefin. Alternatively, however, especially when butadiene is used, the butadiene may be present in the copolymerizate mixture in an amount from one equal to the amount of isobutylene present to eight or nine times as much, as shown in the copending application of Nelson and Welch, Serial No. 788,640, filed November 28, 1947.

The polymerization is conducted by applying to the olefinic material in the reactor a Friedel-Crafts catalyst, preferably in solution in a low freezing non-complex forming solvent. The preferred catalyst material is aluminum chloride in solution in ethyl or methyl chloride or carbon disulfide. However, substantially any of the Friedel-Crafts catalysts disclosed by N. O. Calloway in his article on "The Friedel-Crafts synthesis," printed in the issue of "Chemical Review," published for the American Chemical Society at Baltimore in 1935, in volume XVII, No. 3, the article beginning on page 327, the list being particularly well shown on page 375, may be used. All of the other catalysts may be dissolved in the solvent if desired. For the solvent substantially any of the mono or poly alkyl halides which have freezing points below 0° C., thereby having "low freezing" with respect to water, may be used. Alternatively, carbon disulfide may be used, all of these solvents being characterized by their freedom from any tendency to form a complex with the Friedel-Crafts halide, as shown by the fact that the solvent can be volatilized away from the solute substantially completely without any significant change in boiling point. The catalyst is preferably delivered to the cold polymerizate mixture in the form of a fine jet of more or less cold catalyst solution under relatively high pressure into the body of the strongly stirred polymerizate mixture. Alternatively, many other methods of application of catalyst may be used if desired, these being obvious to those skilled in the art. The essential requirement is of rapid and complete dispersion of the liquid catalyst into the cold polymerizate mixture.

When the polymerization reaction has reached the desired stage, which may be from 50% to 95% or even 100% polymerization of the isoolefin and polyolefin, the material is removed from the reactor and brought up to room temperature; preferably by discharging the reactor contents into warm water or warm alkali solution or warm alcohol, and the solid polymer is separated from the liquid, worked on the hot mill and otherwise purified as desired.

The resulting polymer may have a molecular weight within the range between about 25,000 and about 100,000. For satisfactory commercial use, however, the molecular weight range preferably is substantially narrower than this, ranging from about 35,000 to about 55,000. That is, polymers having molecular weights between 25,000 and 35,000 have a tendency, when cured, to show undesirably low tensile strengths, and polymers above about 60,000 molecular weight show a leathery toughness which makes them difficult to work without any corresponding gain in tensile strength or other properties. The iodine number may vary from about 2 to about 10 for the ordinary polymer, or for specially polymerized materials the iodine number may run as high as about 50. In each instance, however, the iodine number is significantly higher than the obtainable iodine number from the same proportion of diolefin to isobutylene when polymerized according to the process of the prior art.

The material may then be compounded with such substances as sulfur, zinc oxide, stearic acid, carbon black and the like, and cured at appropriate temperatures and times.

The resulting cured polymer shows an excellent tensile strength ranging from 1800 pounds to 4500 pounds per square inch; an elongation at break of from 300% to 1200%; good processing characteristics for such operations as milling, calendering, extruding and the like; a very desirably low heat build-up under rapid flexure; a high abrasion and flexure resistance, and many other very valuable physical properties. In addition, the polymer shows a very valuable increase in speed of curing.

*Example 1*

A series of polymerizations were conducted using different amounts of diluent in the form of difluorodichloromethane and different concentrations of catalyst, the amount of alkane chlorofluoride varying between about one volume per volume of mixed olefins to about 10 volumes per volume of mixed olefins. The mixture was cooled to about −103° C. by the application of a liquid ethylene jacket to the reactor and the polymerization was conducted by the addition of approximately two parts by weight of aluminum chloride per 1,000 parts by weight of mixed olefins to the cold reaction mixture in the form of a solution of the aluminum chloride in methyl chloride, approximately 200 parts by weight of methyl chloride being used.

In each instance, the reactor was cooled to a temperature well below −90° C., and there were then added approximately 10 parts of a mixture of 97% of isobutylene of 98% purity with 3% of isoprene of 96% purity, and there were then added 2 or 3 parts by weight of the alkane chlorofluoride.

The solution of aluminum chloride in methyl chloride was added through a nozzle under pressure into the body of the rapidly stirred reaction mixture, the addition of catalyst occupying approximately 6 minutes in time (although in other instances the time of addition was varied without change in the reaction between 2 minutes and 8 minutes). It was noted that immediately after the catalyst addition was begun, the liquid became translucent, forming a milk white suspension of very fine polymer particles. After 2 or 3 minutes, the reaction suddenly became much more vigorous, and continued for about 5 minutes after the catalyst injection had been completed. Vigorous stirring was continued during the entire time of the addition of the catalyst, and for a period of approximately 20 minutes thereafter. At the close of this time, the contents of the reactor were in the form of a slurry or emulsion of polymer particles in the alkane chloro-fluoride. This liquid slurry was then dumped into warm water to volatilize out the residual unsaturates, the methyl chloride, catalyst solvent and the alkane chloro-fluoride, and at the same time to quench the catalyst. The resulting polymer remained in the form of a moderately fine grained slurry in the water. It was readily separated from the water by a strainer and was then transferred to an open roll mill.

The results are shown in the following table. In each instance the olefinic material consisted of a mixture of three parts of isoprene with 97 parts of isobutylene, both of a degree of purity above about 98%. Each polymerization mixture was diluted with a volume of diluent as shown in the table, and in each instance, comparison polymerizations were conducted, using methyl chloride for the diluent, to show the increase in unsaturation.

| Feed | Vol. of Diluent | Diluent | Mol. Percent Unsaturation | |
|---|---|---|---|---|
| | | | ICl | $I_2HgAc_2$ |
| B-3 | 3 | Methyl Chloride | 1.4 | |
| B-3 | 3 | ....do.... | 1.4 | |
| B-3 | 3 | Dichlorodifluormethane | 1.97 | |
| B-3 | 3 | ....do.... | 1.83 | |
| B-3 | 2 | Methyl Chloride | | 1.67 |
| B-3 | 2 | ....do.... | | 1.77 |
| B-3 | 2 | Dichloromonofluormethane | | 2.12 |
| B-3 | 2 | Dichlorotetrafluorethane | | 2.14 |

This table shows the noticeable increase in iodine number, but does not show the corresponding reduction in cross-linked, insoluble material.

On the mill, the solid polymer was washed with clear water to remove as much as possible of the catalyst breakdown product and polymerizate mixture residue, and was then compounded according to the following recipe:

| | Regular Loaded Recipe | Pure Gum Recipe |
|---|---|---|
| | Parts | |
| Polymer | 100 | 100 |
| Carbon Black | 50 | 10 |
| Zinc Oxide | 5 | 5 |
| Stearic Acid | 3 | 3 |
| Sulfur | 2 | 1.5 |
| Tuads (tetra methyl thiuram disulfide) | 1 | 1.0 |
| Captax | 0.5 | 0 |

The compounded polymer was then cured in a mold under heat and pressure to obtain a cured specimen which, upon test, showed excellent physical properties. Of these properties the physical strengths were about the same, or slightly superior to the physical strengths of prior cured copolymers. The respective elongations at break and moduli also were about the same as or slightly superior to polymers of the prior art. Similarly, the flexure resistance and abrasion resistance were excellent; in addition the material showed a markedly increased curing rate, an adequate state of cure being obtained in from ⅘ to ½ the normal curing time, due in part to the higher unsaturation, in part to the freedom from insoluble material, and in part probably to some other phenomenon connected with the nature of the diluent.

These results show the excellent quality of the polymer as prepared in some of its physical properties.

Thus, the invention polymerizes a mixture of a lower mono-olefin with a lower multiolefin in the presence of a chloro-fluoro-substituted alkane to produce a polymer having a higher unsaturation and higher curing rate, and when cured, an excellent tensile strength, modulus and other properties.

While there are above disclosed but a limited number of embodiments of the process and apparatus of the present invention, it is possible to provide still other embodiments without departing from the inventive concept herein disclosed, and it is therefore desired that only such limitations be imposed upon the appended claims as are stated therein or required by the prior art.

What is claimed is:

1. A polymerization process comprising the steps in combination of mixing together a major proportion of a monoolefin having from 4 to 8, inclusive, carbon atoms per molecule, with a minor proportion of a multiolefin having from 4 to 14, inclusive, carbon atoms per molecule, and polymerizing the resulting mixture with a dissolved Friedel-Crafts catalyst, in the presence of from 1 to 10 volumes (computed upon the mixed olefins) of a liquid selected from the group consisting of dichlorodifluormethane, trichloromonofluormethane, dichloromonofluormethane, dichlorotetrafluorethane, and mixtures thereof, the monoolefin and multiolefin being dissolved in said liquid, and carrying out the polymerization at a temperature between −20° C. and the freezing point of the liquid, the resulting polymer being characterized by a higher unsaturation and higher curing rate.

2. A polymerization process comprising the steps in combination of mixing together a major proportion of isobutylene, with a minor proportion of a multiolefin having from 4 to 14, inclusive, carbon atoms per molecule, and polymerizing the resulting mixture with a dissolved Friedel-Crafts catalyst, in the presence of from 1 to 10 volumes (computed upon the mixed olefins) of a liquid selected from the group consisting of dichlorodifluormethane, trichloromonofluormethane, dichloromonofluormethane, dichlorotetrafluorethane, and mixtures thereof, the isobutylene and the multiolefin being dissolved in said liquid, carrying out the polymerization at a temperature between −20° C. and the freezing point of the liquid, the resulting polymer being characterized by a higher unsaturation and higher curing rate.

3. A polymerization process comprising the steps in combination of mixing together a major proportion of isobutylene with a minor proportion of isoprene and polymerizing the resulting mixture with a dissolved Friedel-Crafts catalyst, in the presence of from 1 to 10 volumes (computed upon the mixed olefins) of a liquid selected from the group consisting of dichlorodifluormethane, trichloromonofluormethane, dichloromonofluormethane, dichlorotetrafluorethane, and mixtures thereof, the isobutylene and isoprene being dissolved in said liquid and carrying out the polymerization at a temperature between −20° C. and the freezing point of the liquid, the resulting polymer being characterized by a higher unsaturation and higher curing rate.

4. A polymerization process comprising the steps in combination of mixing together a major proportion of isobutylene, with a minor proportion of butadiene and polymerizing the resulting mixture with a dissolved Friedel-Crafts catalyst, in the presence of from 1 to 10 volumes (computed upon the mixed olefins) of a liquid selected from the group consisting of dichlorodifluormethane, trichloromonofluormethane, dichloromonofluormethane, dichlorotetrafluorethane, and mixtures thereof, the isobutylene and butadiene being dissolved in said liquid, and carrying out the polymerization at a temperature between −20° C. and the freezing point of the liquid, the resulting polymer being characterized by a higher unsaturation and higher curing rate.

5. A polymerization process comprising the steps in combination of mixing together a major proportion of a monoolefin having from 4 to 8, inclusive, carbon atoms per molecule, with a minor proportion of a multiolefin having from 4 to 14, inclusive, carbon atoms per molecule, and polymerizing the resulting mixture with a dissolved Friedel-Crafts catalyst, in solution in from 1 to 10 volumes (computed upon the mixed olefins) of dichlorodifluoromethane, which is liquid at the polymerization temperature and volatile below the boiling point of water, and carrying out the polymerization at a temperature between —20° C. and the freezing point of the liquid alkane chlorofluoride, the resulting polymer being characterized by a higher unsaturation and higher curing rate.

6. A polymerization process comprising the steps in combination of mixing together a major proportion of isobutylene, with a minor proportion of a multiolefin having from 4 to 14, inclusive, carbon atoms per molecule, and polymerizing the resulting mixture with a dissolved Friedel-Crafts catalyst, in solution in from 1 to 10 volumes (computed upon the mixed olefins) of dichlorodifluoromethane, which is liquid at the polymerization temperature and volatile below the boiling point of water, and carrying out the polymerization at a temperature between —20° C. and the freezing point of the liquid alkane chlorofluoride, the resulting polymer being characterized by a higher unsaturation and higher curing rate.

7. A polymerization process comprising the steps in combination of mixing together a major proportion of isobutylene, with a minor proportion of isoprene, and polymerizing the resulting mixture with a dissolved Friedel-Crafts catalyst, in solution in from 1 to 10 volumes (computed upon the mixed olefins) of dichlorodifluoromethane, which is liquid at the polymerization temperature and volatile below the boiling point of water, and carrying out the polymerization at a temperature between —20° C. and the freezing point of the liquid alkane chlorofluoride, the resulting polymer being characterized by a higher unsaturation and higher curing rate.

8. A polymerization process comprising the steps in combination of mixing together a major proportion of isobutylene, with a minor proportion of butadiene, and polymerizing the resulting mixture with a dissolved Friedel-Crafts catalyst, in solution in from 1 to 10 volumes (computed upon the mixed olefins) of dichlorodifluoromethane, which is liquid at the polymerization temperature and volatile below the boiling point of water, and carrying out the polymerization at a temperature between —20° C. and the freezing point of the liquid alkane chlorofluoride, the resulting polymer being characterized by a higher unsaturation and higher curing rate.

JOHN S. SAYLOR, Jr.

References Cited in the file of this patent

UNITED STATES PATENTS

| Number | Name | Date |
| --- | --- | --- |
| 2,243,470 | Morway | May 27, 1941 |
| 2,356,128 | Thomas | Aug. 22, 1944 |
| 2,534,698 | Calfee | Dec. 19, 1950 |
| 2,548,415 | Welch | Apr. 10, 1951 |